(12) United States Patent
Conley et al.

(10) Patent No.: US 11,562,411 B2
(45) Date of Patent: Jan. 24, 2023

(54) RATING DEVICE THAT IMPOSES DIFFERENTIAL TIME COSTS TO IMPROVE INFORMATION QUALITY

(71) Applicant: The Trustees of Princeton University, Princeton, NJ (US)

(72) Inventors: Dalton Conley, New York, NY (US); Ofer Tchernichovski, Beacon, NY (US)

(73) Assignee: THE TRUSTEES OF PRINCETON UNIVERSITY, Princeton, NJ (US)

( * ) Notice: Subject to any disclaimer, the term of this patent is extended or adjusted under 35 U.S.C. 154(b) by 0 days.

(21) Appl. No.: 17/140,622

(22) Filed: Jan. 4, 2021

(65) Prior Publication Data
US 2021/0209660 A1    Jul. 8, 2021

Related U.S. Application Data

(60) Provisional application No. 62/957,558, filed on Jan. 6, 2020.

(51) Int. Cl.
*G06Q 30/02* (2012.01)
*G06F 3/04847* (2022.01)
(Continued)

(52) U.S. Cl.
CPC ....... *G06Q 30/0282* (2013.01); *G06F 3/0485* (2013.01); *G06F 3/04842* (2013.01); *G06F 3/04847* (2013.01)

(58) Field of Classification Search
CPC ............ G06Q 30/0282; G06F 3/04842; G06F 3/04847; G06F 3/0485
See application file for complete search history.

(56) References Cited

U.S. PATENT DOCUMENTS

2011/0201386 A1*  8/2011  Yariv ............... G06F 3/0488
                                                    455/566
2011/0238670 A1*  9/2011  Mercuri ............ G06F 16/9535
                                                    707/748
(Continued)

OTHER PUBLICATIONS

Spence, "Job market signaling", The Quarterly Journal of Economics, vol. 87, No. 3, pp. 355-374, Aug. 1973.
(Continued)

*Primary Examiner* — Jennifer N Welch
*Assistant Examiner* — Ashley M Fortino
(74) *Attorney, Agent, or Firm* — Meagher Emanuel Laks Goldberg & Liao, LLP

(57) ABSTRACT

Disclosed is a virtual rating device that associate online ratings with differential time costs by endowing the graphical user interface that solicited ratings from the users with "physics," including an initial (default) slider position and friction. When ratings are associated with differential time cost, scores correlated more strongly with objective service quality. The differential time costs optimize information when proportional to the deviation from the median score. Correlations between subjective rating scores and objective service performance can be further improved by boosting time costs for reporting extreme scores. The disclosed device lowers the sample size (and therefore costs) required for obtaining reliable, averaged crowd estimates. The disclosed device improves information quality in online rating and feedback systems. By endowing a rating widget with virtual friction to increase the time cost for reporting extreme scores, one can obtain a more reliable crowd estimates of quality. Implications include improving accuracy of evaluations in e-commerce, and the approach can be generalized and tested in a variety of large-scale online communication systems.

20 Claims, 7 Drawing Sheets

(51) Int. Cl.
*G06F 3/0485* (2022.01)
*G06F 3/04842* (2022.01)

(56) References Cited

U.S. PATENT DOCUMENTS

2015/0378589 A1* 12/2015 Chi ..................... G06F 3/04855 715/786
2017/0235848 A1* 8/2017 Van Dusen ............ G06N 20/00 705/12

OTHER PUBLICATIONS

Gintis et al., "Costly signaling and cooperation", J. Theor. Biol., vol. 213, pp. 103-119, Jul. 17, 2001.
Zahavi, "Mate selection—a selection for a handicap", J. Theor. Biol., Vo., 53, pp. 205-214, 1975.
Grafen, "Biological signals as handicaps", J. Theor. Biol., vol. 144, pp. 517-546, 1990.
Lachmann et al., "Cost and conflict in animal signals and human language", Proc. Natl. Acad. Sci., vol. 98, No. 23, pp. 13189-13194, Nov. 6, 2001.
Weiss, "Human capital vs.Signalling explanations of wages", J. Econ. Perspect., vol. 9, No. 4, pp. 133-154, Fall 1995.
Bagwell et al., "veblen effects in a theory of conspicuous consumption", American economic association review, vol. 86, No. 3, pp. 349-373, Jun. 1996.
Laan et al., "Rescuing collective wisdom when the average group opinion is wrong", Frontiers in Robots and AI, vol. 4, Article 56, pp. 1-21, Nov. 6, 2017.
Jayles et al., "How social information can improve estimation accuracy in human groups", Proc. Natl. Acad. Sci., vol. 114, No. 47, pp. 12620-12625, Nov. 21, 2017.
Mason et al., "Collaborative learning in networks", Proc. Natl. Acad. Sci., vol. 109, No. 3, pp. 764-769, Jan. 17, 2012.
Tversky et al., "Loss aversion in riskless choice: A reference-dependent model", Q. J. Econ., vol. 106, No. 4, pp. 1039-1061, Nov. 1991.
Becket et al., "Network dynamics of social influence in the wisdom of crowds", Proc. Natl. Acad. Sci., vol. 114, : E5070-E5076, Jun. 12, 2017.
Smith et al., "Turtle hunting and tombstone opening, public generosity as costly signaling", Evol. Hum. Behav., vol. 21, pp. 245-261, 2000.
Polnaszek et al., "Why not lie? Costs enforce honesty in an experimental signalling game", Proc. R. Soc. B. Biol. Sci., vol. 281, 20132457, Nov. 13, 2013.
Polnaszek et al, "Receiver tolerance for imperfect signal reliability: Results from experimental signalling games", Anim. Behav., vol. 94, pp. 1-8, 2014.
Coppock, "Generalizing from survey experiments conducted on mechanical turk: A replication approach", Polit. Sci. Res. Methods., vol. 7, No. 3, pp. 613-628, Jul. 2019.
Gao et al., Vocal minority and silent majority: How do online ratings reflect population perceptions of quality?, SSRN Electron J., vol. 39, pp. 565-589, 2015.
Hu et al., "Overcoming the J-shaped distribution of product reviews", Commun. ACM., vol. 52, No. 10, pp. 144-147, 2009.
Luca, "Reviews, Reputation, and Revenue: The Case of Yelp.Com", Available at papers.ssrn.com/sol3/papers.cfm? abstract_id= 1928601, 2011.
Centola et al., "The spread of behavior in an online social network experiment", Science, vol. 329, pp. 1194-1197, Sep. 3, 2010.
Centola et al., "The spontaneous emergence of conventions: An experimental study of cultural evolution", Proc. Natl. Acad. Sci, vol. 112, pp. 1989-1994, 2015.
Moe et al., "Online product opinions: Incidence, evaluation, and evolution", Mark Sci., vol. 31, pp. 372-386, 2011.

* cited by examiner

RATING DEVICE THAT IMPOSES DIFFERENTIAL TIME COSTS TO IMPROVE INFORMATION QUALITY

CROSS-REFERENCE TO RELATED APPLICATIONS

This application claims priority to U.S. Provisional Patent Application No. 62/957,558 Filed Jan. 6, 2020, which is herein incorporated by reference in its entirety.

BACKGROUND

One of the most appealing features of online communication is the high speed and low cost of sharing unfiltered opinions, ideas, and ratings. But theory predicts a validity crisis of cost-free communication: In both economics and biology, costly signaling theory suggests that to maintain reliability, communication systems must be based on costly signals, or at least on signals that are costly for dishonest signalers. Signaling cost ensures that cheating would not pay (or would not be possible) for signalers that are not strong enough and/or who are not sufficiently motivated to signal. This principle explains, for example, why male peacocks advertise their quality by growing a long-ornamented tail, why offspring signal their nutritional needs by costly begging displays, why among humans, job candidates advertise their quality by top-school diplomas, and why economic wealth may be advertised by conspicuous consumption. In all of these cases, if signaling were cost-free, cheating would prevail and the information value of signals would have diminished.

In online rating, one can leverage the "wisdom of the crowd" to improve the quality of information, by exploiting the phenomenon that aggregate subjective ratings can be more accurate than the rating of any individual. In that case the prediction of costly signaling theory is subtler because signalers do not usually communicate to advertise their own quality or needs to gain something in return (such as a mate, food, or a job). Instead, they express their opinion or share information in an altruistic way, which does not seem to involve the conflict of interests between signaler and receivers that typically motivates cheating. But even if there is no motivation to cheat, there is, at best, ambiguous direct benefit to the rater in providing an accurate assessment of provider quality. Especially in the absence of a conflict or clear, direct benefits, signalers are likely to provide low-quality information.

Therefore, a technique for improve the quality of information received from aggregate ratings is desirable and useful.

BRIEF SUMMARY

The lack of high quality information raises two hypotheses: According to rational action theory in a communication ecology where the benefits are diffuse and the costs are borne by the individual, the best strategy to improve the wisdom of the crowd is to make rating as costless as possible to reduce barriers for raters to provide the best possible information. Alternatively, costly signaling theory would suggest the opposite dynamic: By imposing a cost to providing information and especially by imposing higher costs on reporting extreme ratings, only those who are confident in their assessment and highly motivated to share that assessment may be willing to pay. In this way, the cost of signal production can filter out unreliable cooperative signalers.

Disclosed herein is a rating system that imposes differential time costs to improve information quality. The disclosed system improves information quality in online rating and feedback systems.

A first aspect of the present disclosure is therefore drawn to a method for online ratings. The method requires several steps, including (i) displaying at least one user selectable interface component (such as a slider bar, or one button that adjusts the rating value up and one button that adjusts the rating value down) related to a displayed rating value; and (ii) allowing a user to click or drag the at least one user selectable interface component in order to adjust the displayed rating value from an initial rating value to an adjusted rating value. A differential time cost for adjusting the displayed rating value is introduced, which is based on a difference between the adjusted rating value and the initial rating value, such that greater differences have greater time costs. In this way, a first difference has a first time cost, and a second difference greater than the first difference has a second time cost greater than the first time cost. For example, when rating a product on a scale front 1-5, with an initial value of "3", the time cost to adjust a rating from a "3" to a "4" will be less than adjusting the rating from a "3" to a "5".

Optionally, there is a linear relationship between the differential time cost and the difference between the adjusted rating value and the initial rating value. Optionally, there is a nonlinear relationship between the differential time cost and the difference between the adjusted rating value and the initial rating value. Optionally, an increase in the differential time cost only occurs if the adjusted rating value is higher than the initial rating value.

Optionally, the method also includes displaying a button for submitting the displayed rating value, and sending to a remote server the rating value that was displayed when the button was clicked or selected by a user.

Optionally, the method also includes sending at least one adjusted rating value to a remote server.

Optionally, the initial rating value displayed for a first user is at least partially based on a previous rating provided by at least one other user.

Optionally, the displayed rating value is associated with a product or service, and in some instances, the differential time cost can vary by product or service.

A second aspect of the present disclosure is drawn to a system for online ratings. The system includes at least one processor configured to: (i) display at least one user selectable interface component (such as a slider bar, or one button that adjusts the rating value up and one button that adjusts the rating value down) related to a displayed rating value, and (ii) allow a user to click or drag the at least one user selectable interface component in order to adjust the displayed rating value from an initial rating value to an adjusted rating value. A differential time cost for adjusting the displayed rating value is introduced, which is based on a difference between the adjusted rating value and the initial rating value, such that a first difference has a first time cost, and a second difference greater than the first difference has a second time cost greater than the first time cost.

Optionally, there is a linear relationship between the differential time cost and the difference between the adjusted rating value and the initial rating value. Optionally, there is a nonlinear relationship between the differential time cost and the difference between the adjusted rating value and the initial rating value. Optionally, an increase in the differential time cost only occurs if the adjusted rating value is higher than the initial rating value.

Optionally, the processor is further configured to display a button for submitting the displayed rating value, and to send (to a remote server) the rating value that was displayed when the button was clicked or selected by a user.

Optionally, the processor is further configured to send at least one adjusted rating value to a remote server.

Optionally, the initial rating value displayed for a first user is at least partially based on a previous rating provided by at least one other user.

Optionally, the at least one processor exists on a mobile device or desktop computer.

Optionally, the displayed rating value is associated with a product, and in some instances, the differential time cost can vary by product.

A third aspect is also drawn to specific embodiments of the above-described system for online ratings. The disclosed system includes a remote server configured to send code to a client causing the client to display at least one user selectable interface component related to a displayed rating value. The client is configured to allow a user to click or drag the at least one user selectable interface component in order to adjust the displayed rating value from an initial rating value to an adjusted rating value. A differential time cost for adjusting the displayed rating value is introduced, which is based on a difference between the adjusted rating value and the initial rating value, such that a first difference has a first time cost, and a second difference greater than the first difference has a second time cost greater than the first time cost. Optionally, the client sends a code to the remote server indicating an adjusted rating value, and in response the remote server sends a code to the client indicating a differential time cost associated with the adjusted rating value.

DETAILED DESCRIPTION

Figure 1A:
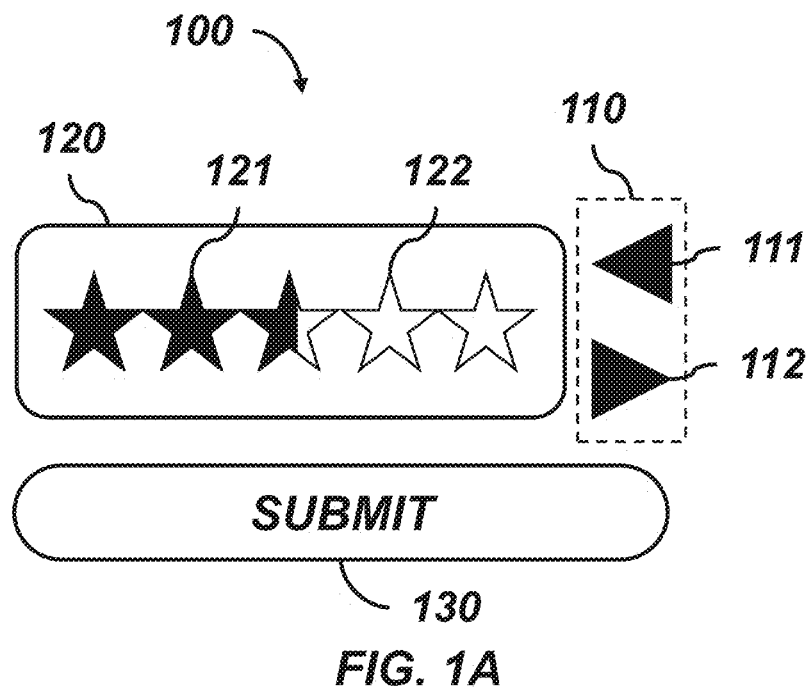
FIGS. 1A and 1B are schematic illustrations of one portion of an embodiment of the disclosed system.

Disclosed is a method for online ratings. Ratings are associated with differential time costs by endowing a Graphical User Interface element that solicits ratings from users with 'physics', such as including an initial (default) slider position and introducing a feeling of friction when moving the slider position. When ratings were not associated with differential cost (e.g., all scores from 0 to 100 could be given by an equally low-cost single click on the screen), the information quality was low. By introducing differential time costs, information quality improved.

Thus, the method requires at least two steps.

The first step is to display at least one user selectable interface component and a rating value. The rating could be any appropriate rating scheme, where numerical values can be assigned to each rating (e.g., a numerical rating scale from 0-100, a letter grading scales of A-Em where A=4 and E=0, a rating scale of 1-3 stars, etc.). In some embodiments, the rating scale is essentially a continuous scale from a minimum to a maximum (e.g., 0, 0.1, 0.2, . . . 5). In some embodiments, the rating scale utilizes discrete values between a minimum and a maximum (e.g., 0, 2, 3, or 4 stars).

In some embodiments, the initial rating value is the median or mean value of the rating range. In some embodiments, the initial rating value is biased towards higher ratings (e.g., the initial rating value is a predetermined value in the top 50% of the rating range). In some embodiments, the initial rating value is biased towards lower ratings (e.g., the initial rating value is a predetermined value in the bottom 50% of the rating range).

In some embodiments, those initial ratings are fixed and do not change from one user to another. In other embodiments, however, the initial rating value displayed for a first user is at least partially based on a previous rating provided by at least one other user. For example, if the initial rating value is "5" on a scale of 1-10, and after a plurality of raters, the average rating received is a "7", the initial rating value may be adjusted to be a "6" or a "7". In some embodiments, the initial rating value is based on all received ratings, while in other embodiments, the initial rating value is based only on a subset of the received ratings, such as the ratings for the last hour, a predetermined number of ratings (such as the last 10, 100, or 1,000 ratings), or some other subset as appropriate.

In some embodiments, the displayed rating value is associated with one or more services. In some embodiments, the displayed rating value is associated with one or more products.

The selectable interface component is configured to relate to the rating value (i.e., interacting with the selectable interface component can result in changes to the displayed rating value). The components is preferably a slider bar and/or two buttons, where one button adjusts the rating value up and one button that adjusts the rating value down. Other selectable interface components known to skilled artisans can be utilized, provided a differential cost can be associated with adjustments to the component.

The method then requires allowing a user to click or drag the at least one user selectable interface component in order to adjust the displayed rating value from an initial rating value to an adjusted rating value.

For example, as seen in FIG. 1A, the displayed elements 100 include selectable interface components 110, which are shown here as comprising a "left" arrow button 111 and a "right" arrow button 112, which are related to the displayed rating value 120. Here, the "ratings" are displayed as the number of filled-in stars 121, with 0 filled stars being the "worst" rating, and 5 filled stars being the "best". Here, the "right" button 112 could be configured to start increasing the rating value, visually shown by starting to increase the number of filled-in stars from the initial value of 2.5 stars to, e.g., 2.6 stars (shown), and on towards 4 or 5 stars (i.e., filling in some of the unfilled stars 122 in FIG. 1A), and the "left" button 111 could be configured to start to decrease the rating value, and decreasing the number of filled-in stars 121 from 3 stars towards 2 or 1 stars.

Figure 1B:
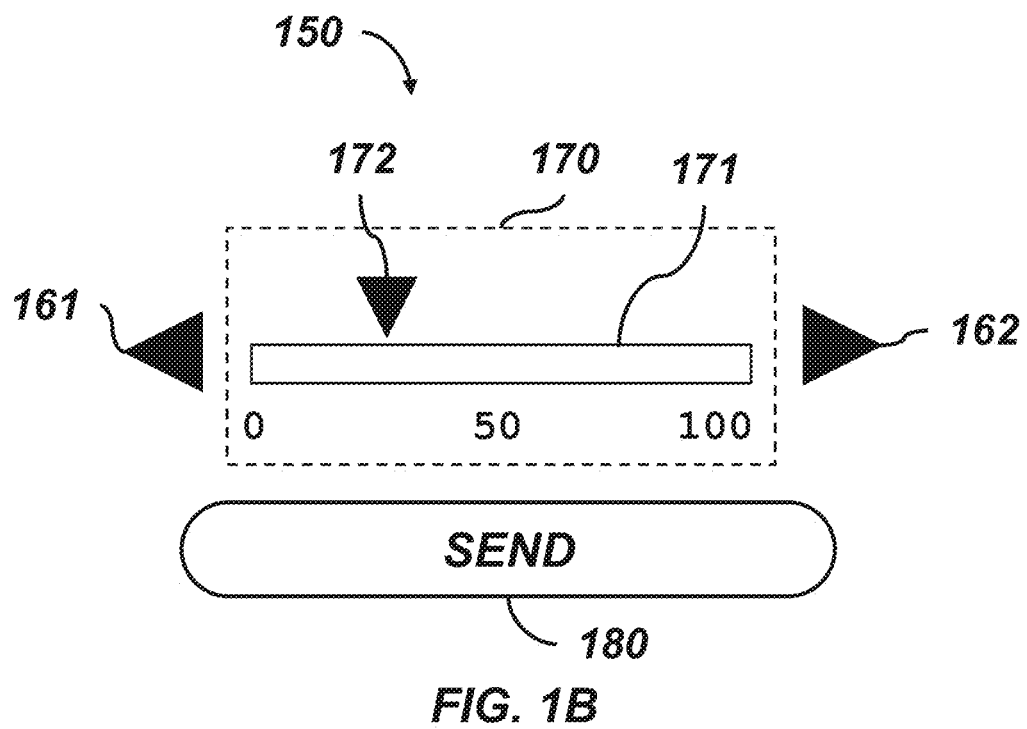

Another example, seen in FIG. 1B, shows the displayed elements 150 include selectable interface components 161, 162 which are also shown as "left" arrow button 161 and "right" arrow button 162. These are related to the displayed rating value 170. Here, the "ratings" are displayed as the rating bar 171 (which may include a color gradient to indicate "best" to "worst" ratings, tick marks, etc. as appropriate), and associated numbers "0", "50", and "100" below the rating bar 171, defining the range of possible ratings. The arrow 172 above the scale indicates the current value, and it will move left or right (decreasing or increasing the rating, respectively), depending on which arrow button 161, 162 is pressed, and for how long.

A differential time cost for adjusting the displayed rating value is utilized. The differential time cost is based on a difference between the adjusted rating value and the initial rating value, such that greater differences have greater time costs. In this way, a first difference has a first time cost, and a second difference greater than the first difference has a second time cost greater than the first time cost. For example, when rating a product on a scale from 1-5, with an initial value of "3", the time cost to adjust a rating from a "3" to a "4" will be less than adjusting the rating from a "3" to a "5".

As an example, as part of a game involving a simulated ferry ride, subjects were prompted to rate their satisfaction with the ferry by adjusting the slider position using two buttons: pressing continuously on either the left or right button moved the slider, at a constant velocity, toward the desired position on the scale. This moderate constant friction allows reporting of scores within less than 3 seconds. That is, time costs of reporting scores increased linearly with distance from initial slider position at the range of a few seconds.

In some embodiments, the differential time cost varies from service to service, or from product to product. For example, there may be a lower time cost associated with, e.g., rating a product that has been on the market for some time, as compared to a rating for a brand new product.

In some embodiments, there are step changes in the differential time cost at predetermined thresholds. For example, the "friction" between a rating of 3 and 4 is a first constant, and then there is a step change such that the "friction" between a rating of 4 and 5 is a different function and/or different constant.

In some embodiments, there is a linear relationship between the differential time cost and the difference between the adjusted rating value and the initial rating value.

In some embodiments, there is a nonlinear relationship between the differential time cost and the difference between the adjusted rating value and the initial rating value.

In some embodiments, an increase in the differential time cost only occurs if the adjusted rating value is higher than the initial rating value.

In some embodiments, the adjusted rating values are sent to a remote server. In some embodiments, the remote server receives each adjustment that is, if a user first adjusts the rating from "50" to "60", and then adjusts it back to "40", the remote server receives at least the intermediate "60" and the final "40". In some cases, every button click and/or duration of a button click is received by the remote server.

In some cases, there is also a button 130 for submitting the displayed/adjusted rating value. Upon receiving indication that the submit button 130 has been selected, the processor may then send (to a remote server) the rating value that was displayed when the button was clicked or selected by a user.

Figure 2:
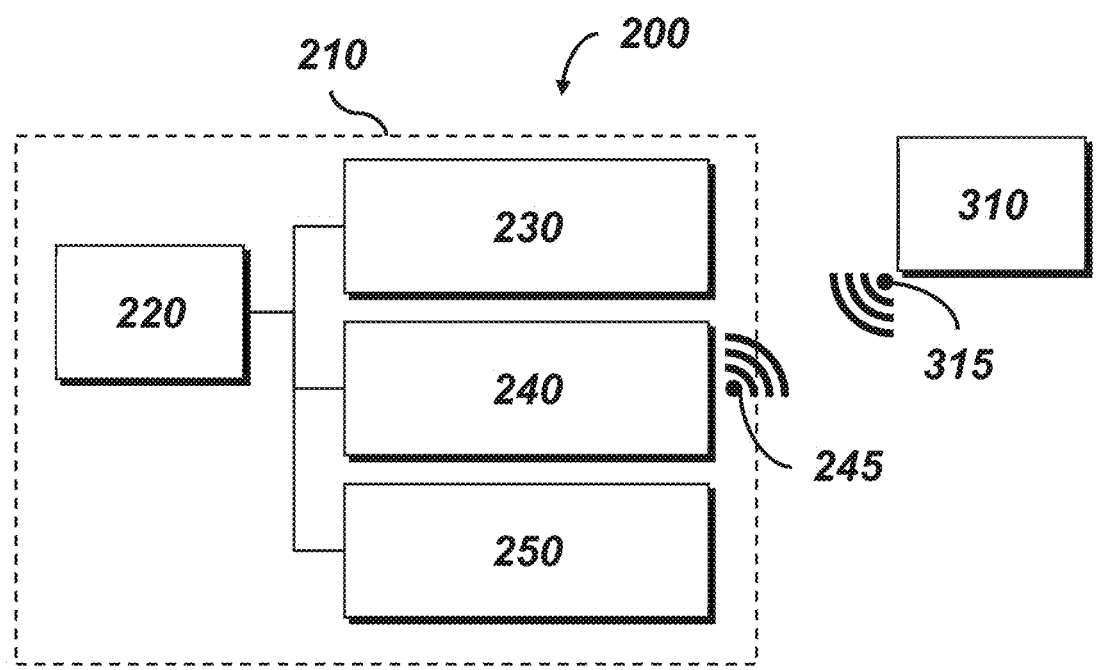
FIG. 2 is a schematic illustrating a simplified example of the disclosed system.

A second aspect of the present disclosure is drawn to a system for online ratings. As seen in FIG. 2, the system 200 includes at least one processor 220 (including memory, etc.), in communication with a display 230 (which may have its own memory and/or GPU), a wired or wireless communication interface 240, and optionally other components 250 (such a battery or power connection, speakers, buttons, additional displays, etc.). The system may optionally be located within a housing 210. As understood by skilled artisans, the processors do not need to be located in the same device, provided the processors can communicate in some fashion. Thus, in some embodiments, one or more processors may be located in a mobile device (such as a smartphone, tablet, etc), on a desktop computer, and/or on a remote server (not shown). The at least one processor 220 is configured with instructions that, when executed, cause the system to: (i) display (on display 230) at least one user selectable interface component (such as a slider bar, or one button that adjusts the rating value up and one button that adjusts the rating value down) related to a displayed rating value, and (ii) allow a user to click or drag the at least one user selectable interface component in order to adjust the displayed rating value from an initial rating value to an adjusted rating value.

As described previously, a differential time cost for adjusting the displayed rating value is utilized, which is based on a difference between the adjusted rating value and the initial rating value, such that a first difference has a first time cost, and a second difference greater than the first difference has a second time cost greater than the first time cost.

In some embodiments, there is a linear relationship between the differential time cost and the difference between the adjusted rating value and the initial rating value.

In some embodiments, there is a nonlinear relationship between the differential time cost and the difference between the adjusted rating value and the initial rating value.

In some embodiments, an increase in the differential time cost only occurs if the adjusted rating value is higher than the initial rating value.

As described previously, in some embodiments, the differential time cost used for a given rating will vary by product or service.

The processor may be further configured to cause at least one adjusted rating value to be sent to a remote server.

The processor may be further configured to display a button for submitting the displayed rating value, and to send (to a remote server) the rating value that was displayed when the button was clicked or selected by a user. In some embodiments, the processor receives the displayed rating value, then submits the received rating value to the remote server as part, of a request to store the data.

In some embodiments, the processor is configured to adjust an initial rating value being displayed for a first user in a manner at least partially based on a previous rating provided by at least one other user.

In some embodiments, the processor is configured to associate the displayed rating value with a product or service, such as by associating the rating value with a unique code associated with a product (or service). In some embodiments, the processor will be configured to submit the unique code and the displayed rating value to a remote server.

In some embodiments, the disclosed system 200 includes a remote server 310 configured to communicate 245, 315 with the wired or wireless communication interface 240. The remote server 310 is configured to send code to a client (here, the components in housing 210) causing the client to display at least one user selectable interface component related to a displayed rating value on its display 230. The client is configured to allow a user to click or drag the at least one user selectable interface component in order to adjust the displayed rating value from an initial rating value to an adjusted rating value. As discussed above, a differential time cost for adjusting the displayed rating value is used, which is based on a difference between the adjusted rating value and the initial rating value, such that a first difference has a first time cost, and a second difference greater than the first difference has a second time cost greater than the first time cost.

Present technology aims at minimizing client efforts in reporting feedback. The disclosed device selectively increases these efforts to improve information quality. It solves the problem of low-quality information in online systems, where distribution of reports tends to extremes. In current Star ratings, for example, there are many 1 Star and 5 Star ratings that do not reflect the ground truth (which is usually a Gaussian distribution).

More particularly, disclosed herein is a virtual rating device that associate online ratings with differential time costs by endowing the graphical user interface that solicited ratings from the users with "physics," including an initial (default) slider position and friction. When ratings are associated with differential time cost, scores correlated more strongly with objective service quality. The differential time costs optimize information when proportional to the deviation from the median score. Correlations between subjective rating scores and objective service performance can be further improved by boosting time costs for reporting extreme scores. The disclosed device lowers the sample size (and therefore costs) required for obtaining reliable, averaged crowd estimates. The disclosed device improves information quality in online rating and feedback systems. By endowing a rating widget with virtual friction to increase the time cost for reporting extreme scores, one can obtain a more reliable crowd estimates of quality. Implications include improving accuracy of evaluations in e-commerce, and the approach can be generalized and tested in a variety of large-scale online communication systems.

Example 1

In a first example game, players used their web browsers to play a game implemented using WebGL technology, where the server-side code was programmed using PHP and MySQL, and client-side code was programmed in Javascript using PIXI-JS library for animation. Subject actions were automatically recorded to MySQL database tables for analysis. maneuvered a simulated car to collect coins. They received one cent for each coin collected. Roads were separated by lakes, and players had to tide a simulated ferry to cross each lake. The first two ferry rides were used as a training set, with delays of 20 s and then 4 s, to set a common baseline for ferry performance evaluations. Thereafter, the delays and speeds of ferry services were randomly varied. Some ferries arrived immediately and traversed the lake without delay, allowing subjects to complete the journey within 2 s. Other ferries were delayed in arrival and slow moving, requiring up to 40 s to cross (uniform distribution of times, 2-40 s). At the end of each ferry ride, subjects were prompted to rate their satisfaction with the ferry service on a scale of 0-100 before they could continue to play: "Please rate shuttle service" above a color-coded scale from 0-100, with 0 being red, and 100 being green, and a "Send" button below it. The total game duration was limited to 15 min. Subjects were therefore motivated to complete their ranking as soon as possible as this subtracted from their time to collect monetary rewards. Before the game, subjects were informed that ferry services will vary in speed and delay and were asked to accurately score their satisfaction after each service event. Game sessions were timed and synchronized to create an experience similar to that of a multiplayer online game. Specifically, cohorts of subjects were recruited via M-Turk for each session about 20 min prior to each session onset. Once a subject logged in, a virtual "waiting room" was presented, with a timer countdown to the beginning of the session. At time 0, a "gong" sound was played, and subjects were then presented with a 1-min video with technical instructions for maneuvering the simulated car. The game then started promptly.

In a survey after game completion, subjects were not able to reliably guess if their rating scores affected ferry performances. A random sample of 234 participants was presented with a survey immediately after the game. The survey question stated: "The study design divided players into two groups. In one group, feedback affected ferry performance, in the other group ferry performance was random. To which group do you think you were assigned?" A total of 46% correctly stated that ferry performance in their group was random. A total of 28% stated that rating scores have, or might have affected ferry performance in their group. The remaining 26% could not tell.

Each individual used the ferry services several times (mean=17.6 rides per subject). Thus, one is able to measure correlations between subjective ratings and objective service performance (total time to take the ferry) both within and across subjects (26). Since repeated rating scores are not independent measures, statistical evaluations were done at the subject level.

Signaling time costs were manipulated via the "physics" of the graphic user interface that recorded the ratings. This allowed one to test if signaling costs can affect the correlation between subjective rating and ground truth. For the control group, a click bar was used where all scores from 0 to 100 could be given by an instant click on the screen (all ratings are equally "cheap"). This represents the conventional cost-free method used in most rating systems. For all other groups we imposed differential signaling time cost using "sliders": A slider has an initial default position and "velocity," which can be easily manipulated (via programming) to impose a feeling of "friction" while moving the slider.

Figure 3A:
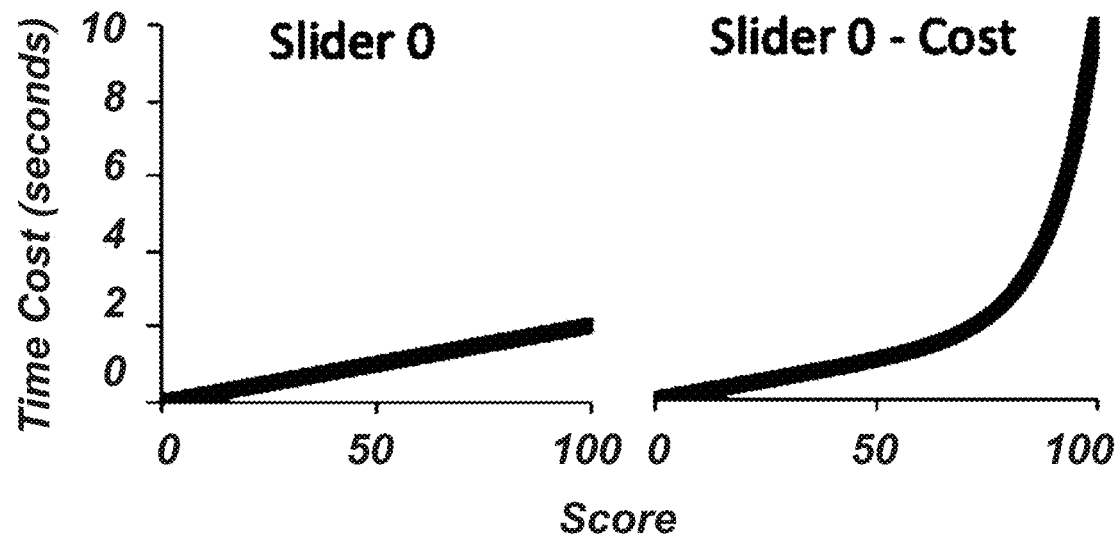
FIGS. 3A-3C are graphs of time costs (in seconds) to adjust to a given final rating (0-100) with linear (left) and non-linear (right) costs, for initial settings of "0" (3A), "50" (3B), and "75" (3C).
Figure 3B:
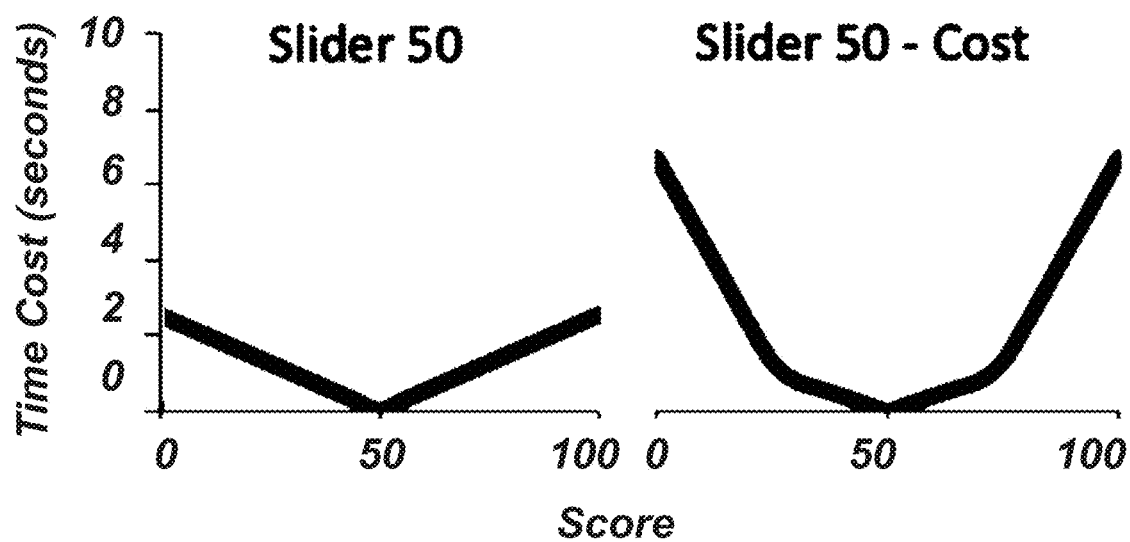
Figure 3C:
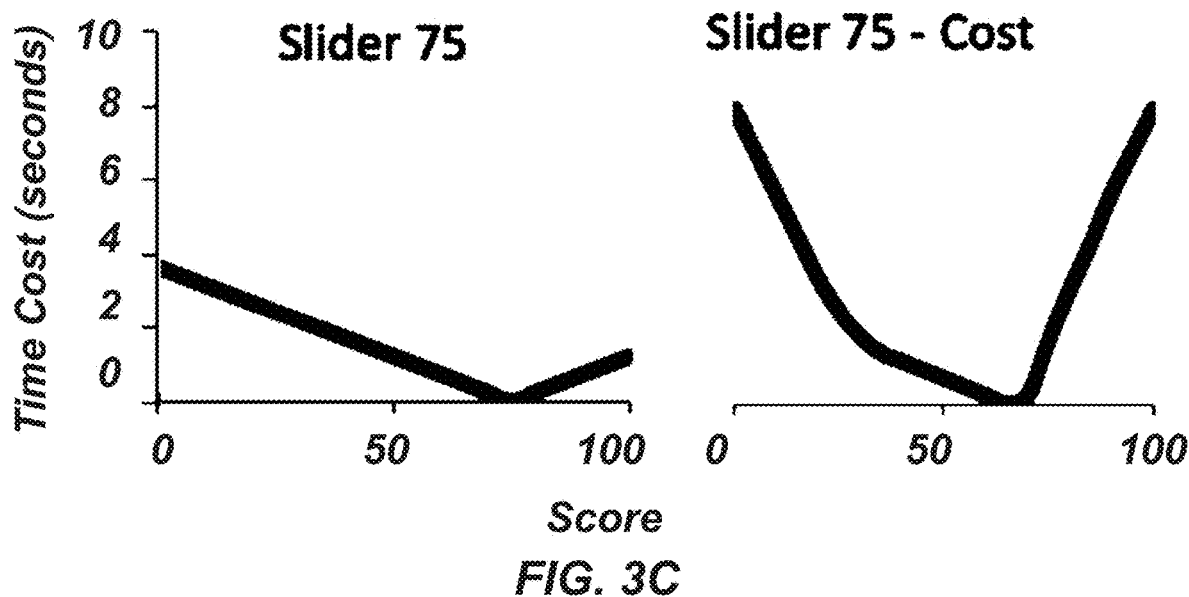

After each ferry ride, subjects were prompted to rate their satisfaction with the ferry by adjusting the slider position using two buttons: pressing continuously on either the left or right button moved the slider, at a constant velocity, toward the desired position on the scale. This moderate constant friction allows reporting of scores within less than 3 s. That is, time costs of reporting scores increased linearly with distance from initial slider position at the range of a few seconds (see, e.g., FIGS. 3A-3C, left graphs)

Six groups were tested, with n=40 subjects per group, and with repeated trials adding to about 600-800 rating scores per group: the control group rated ferry rides using a click bar. The remaining five groups rated ferry rides using the slider with initial default position at 0, 25, 50, 75, or 100. For each group the time cost of rating is proportional to the distance from these defaults. Setting an initial slider position at 0 imposes time costs that are proportional to the reported quality, an initial position at 100 imposes time costs that are inversely proportional to the reported quality, and setting an initial position near the center of the expected distribution of scores imposes time costs that are proportional to the deviation from expectation (either up or down). Note that the initial slider position also offered a cheap default score: subjects could simply accept it without even touching the slider at no added time cost.

Figure 4:
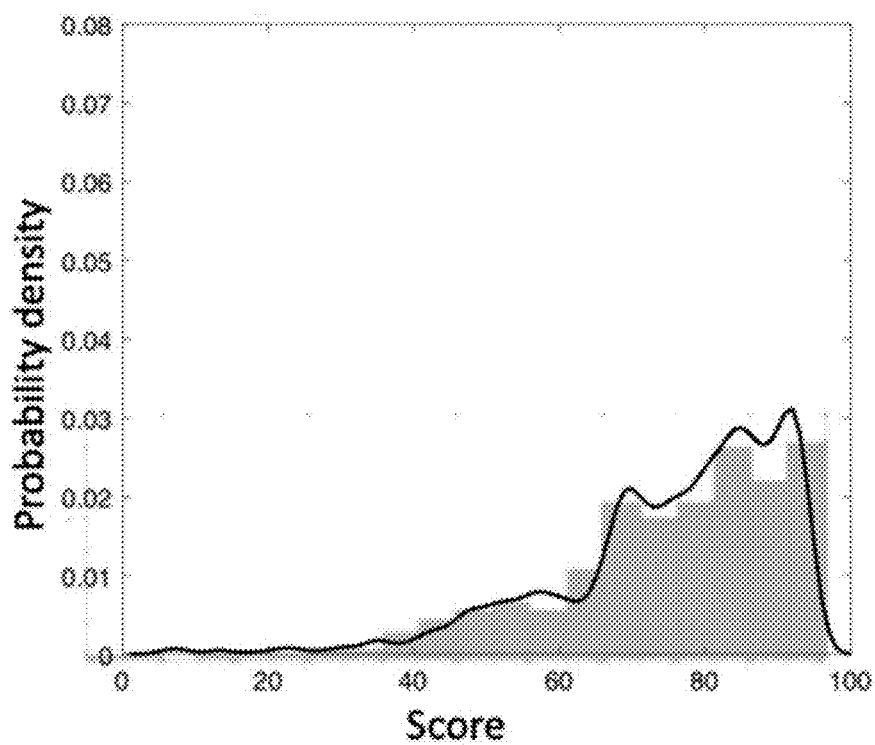
FIG. 4 is a smoothed histogram of ferry rating scores for the click-bar group.

FIG. 4 presents a histogram of ratings for the click-bar (zero cost) group, pooled over all subjects. As shown, the distribution of rating scores is strongly skewed toward the upper end of the scale (mean score=78.3) despite the uniform distribution of ferry delays. This is a common observation for online rating systems where scores follow a J-shaped distribution.

Figure 5:
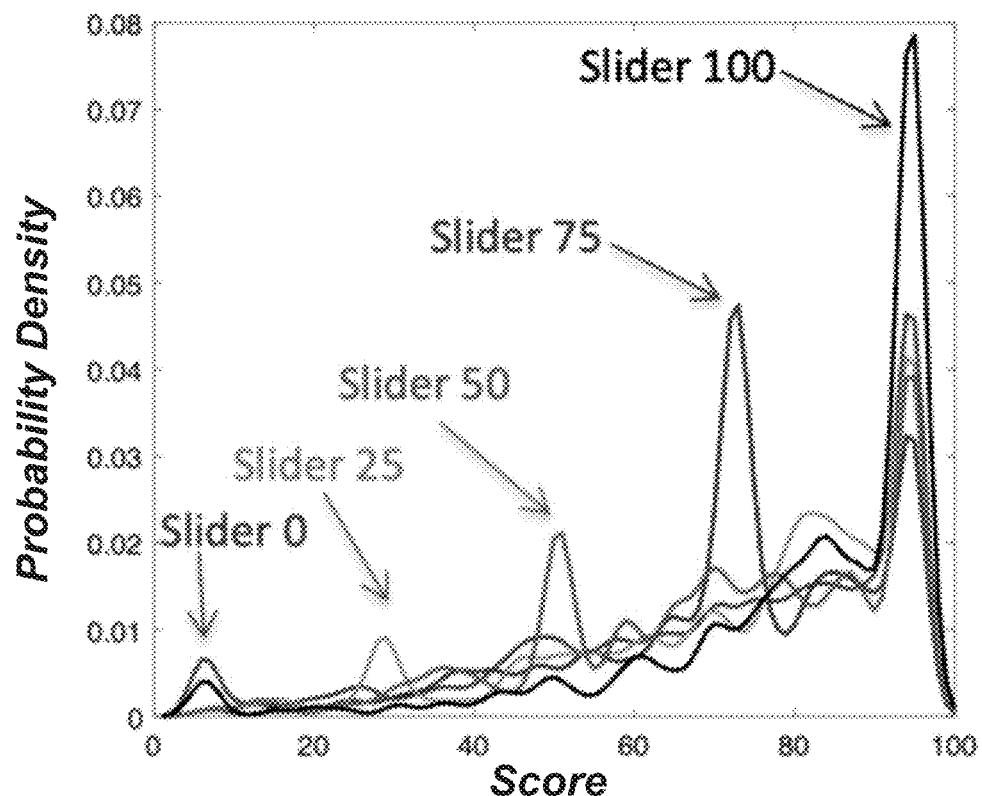
FIG. 5 shows the combined smoothed histograms of ferry rating for the five slider groups, where peaks represent cases where subjects submitted default scores.

As seen in FIG. 5, in the slider groups, histograms of subjective ratings showed similarly skewed distributions, except that the distributions show a peak at 100 (an upper-edge effect of the device) and a second peak at the initial default position of the slider. This second peak represents cases where subjects most likely submitted their scores without changing the default slider position. Note that the height of these "default" peaks increases with the initial slider position (lowest at 0 and highest at 100), most likely due to subjects' higher tendency to "accept" a default slider position that is similar to the rating score they had in mind. This result is consistent with a working hypothesis according to which the time cost motivates subjects to accept the default unless they have strong contrary opinion. Default ratings are also apparent in the scatterplots of ferry delays versus rating scores for each group. Within-subject linear regression estimates are plotted. Interestingly, the scatterplots and regression lines appear tightest in the slider-75 group, where the default peak was closest to the population mean (mean score=76.5, median 81, pooled over all groups).

The coefficients of determination, $R^2$s, of ferry delays on rating scores were pooled over all subjects. $R^2$s for the slider-50 and slider-75 groups were about twice those in the click-bar group. Planned pairwise comparisons using shuffle statistics (i.e., shuffling subjects across groups) reveal a statistically significant difference in $R^2$s between the click-bar group and the slider-50 and slider-75 groups (P=0.017 and 0.004, respectively, Bonferroni adjusted direct P values for five comparisons). Differences in $R^2$s between click-bar and other slider groups were not significant (slider 0: P=0.203; slider 25: P=0.3; slider 100: P=0.104, uncorrected). Interestingly, despite the significant effect on the pooled correlations, $R^2$ values obtained within subjects were fairly similar and show no trends across groups. Therefore, the advantage of slider 50 and slider 75 appears to be in "calibrating" the rating scores at the crowd level.

Since the initial position of slider 75 is close to the center of distribution of scores, this outcome is consistent with the notion that imposing time costs, proportional to deviation from expected reported quality should improve reliability via calibration.

Online rating systems are often used to leverage the wisdom of the crowd. Namely, aggregating judgments across subjects can often improve accuracy by balancing idiosyncratic biases across individuals when averaging observations. To determine if costly signaling also benefits these crowd estimates, ferry delays were binned into 20 performance categories according to their time delays (2-s bins: 1-2, 3-4, 5-6, . . . , 39-40 s). Within each bin, the scores were averaged across subjects and calculated the $R^2$s between those averaged scores and ferry delays across bins. As expected, the averaged $R^2$s of the binned data were very high, (about 0.9) in all groups. One can now ask two practical questions: First, how does the rating device affect the sample size needed before objective performance differences can be detected? Second, how does the rating device affect the efficiency of different selection regimes over time? For example, how fast can one learn to select top-performing ferries while sampling rating scores from different bins? One can focus on sample size because rating systems are subject to a tradeoff between speed and accuracy: improving accuracy requires aggregating more rating data over time, at the expense of timely response.

Figure 6:
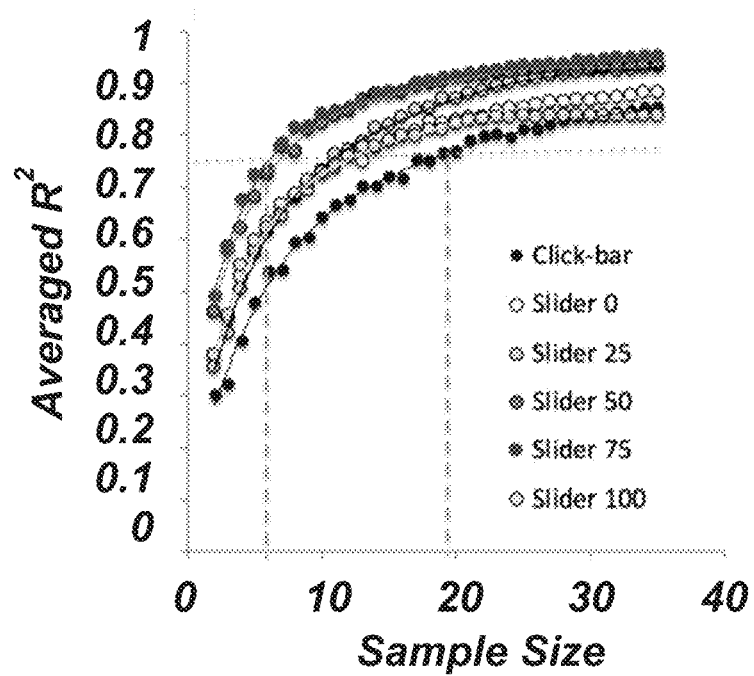
FIG. 6 is a graph showing an estimation of crowd wisdom, where sample size is number of rating scores per bin, dotted lines indicate the number of rating scores required for mean scores to explain 75% percent of the variance in ferry delays (about 6 for Slider-75 vs 20 in the click-bar groups).

To estimate the sample size needed for reliably distinguishing across objective performance groupings, random samples of rating scores were drawn from binned groups of ferry performances and calculated averaged for different "crowd" (sample) sizes. As shown in FIG. 6, in the slider-75 group a sample size of about six rating scores from each bin was sufficient to explain 75% of the variance in rating scores across performance groupings. In contrast, a sample of about 20 ratings from each bin was needed to reach the same level in the click-bar group. Thus, the benefit of costly signaling is also evident with respect to crowd wisdom.

To quantitatively evaluate how costly rating devices may affect the efficiency of different selection policies over time, consider an agent who needs to select ferry services on a regular basis. If service quality fluctuates it is critical to update the selection policy as soon as possible (based on small samples of ferry scores). To simulate such a situation, one can consider each ferry performance bin as representing the performance of a particular ferry service provider (i.e., 20 providers with time delays of 1-2, 3-4, 5-6 s, etc.). One can then simulated a dispatcher who needs to select the best (or to avoid the worst) provider by evaluating the provider's rating scores. The dispatcher initially deploys the providers at random with equal probability and, in turn, receives subjective rating scores on user satisfaction. The dispatcher updates the probability of selecting a provider by, either increasing it for providers that received the top scores (selection favoring top ratings), or alternatively, reducing it for those that received low scores (selection avoiding bottom ratings).

As an estimate of learning speed, one can computed the number of ratings needed for the dispatcher to cut the expected ferry delays by half. For each experimental group, a dispatcher was simulated who had to select among ferry service providers and observed a subjective rating for each ferry ride. The corresponding objective ferry delays of the provider were invisible to the dispatcher. The task of the dispatcher was to select the ferry providers with the shortest delays or to avoid those with long delays. There were 20 ferry providers spanning the range of delays (the same 20 bins as before). Note that within each bin ferry delays were similar, but the observed rating scores were noisy. The dispatcher aimed at either choosing the fastest, or at avoiding the slowest ferries by considering (sampling) the rating scores. At any point in time the dispatcher selected a provider i with probability $p_i$. A rating for this choice was obtained by drawing at random from the subjective rating collected online from the i-th delay bin. Initially, $p_i$=0.05 for all i=1, . . . 20. After observing 40 ratings the dispatcher iterated on the selection policy by updating the probabilities $p_i$ as follows: for selection for top scores, increment the probability, $p_i \leftarrow p_i + 0.005$, for the provider i with the highest rating among the 40 draws. For avoiding bottom scores, decrement the probability, $p_i \leftarrow p_i - 0.005$, for the provider i with the lowest rating among the 40 draws. Then renormalize the probabilities, $p_i \leftarrow p_i / \text{sum}_{i=1:20} p_i$; compute the expected mean of sample ferry delays according to the current probabilities, and repeat the process by drawing another 40 ratings as before. Keep running iterations, and stop when the expected mean of sampled ferry delays is reduced by half.

As expected, estimates of learning speed mirrored the correlations presented earlier: the simulated dispatcher learned faster using rating data obtained with slider 75 compared with click bar. Learning was particularly slow with slider 100, where time costs were negatively proportional to the reported quality. Interestingly, costly rating devices learning speed varied strongly across selection regimes; one can see an asymmetry in learning durations across the slider groups, where mean learning durations for sliders 50, 75, and 100 are below the diagonal, whereas sliders 0 and 25 are above the diagonal. Therefore, simulation suggests that with high initial slider position, it might be easier to avoid poor ferry services, and with low initial position, it might be easier to pick top ferry services. In the absence of cost (click bar) the two selection methods performed the same.

Figure 7:
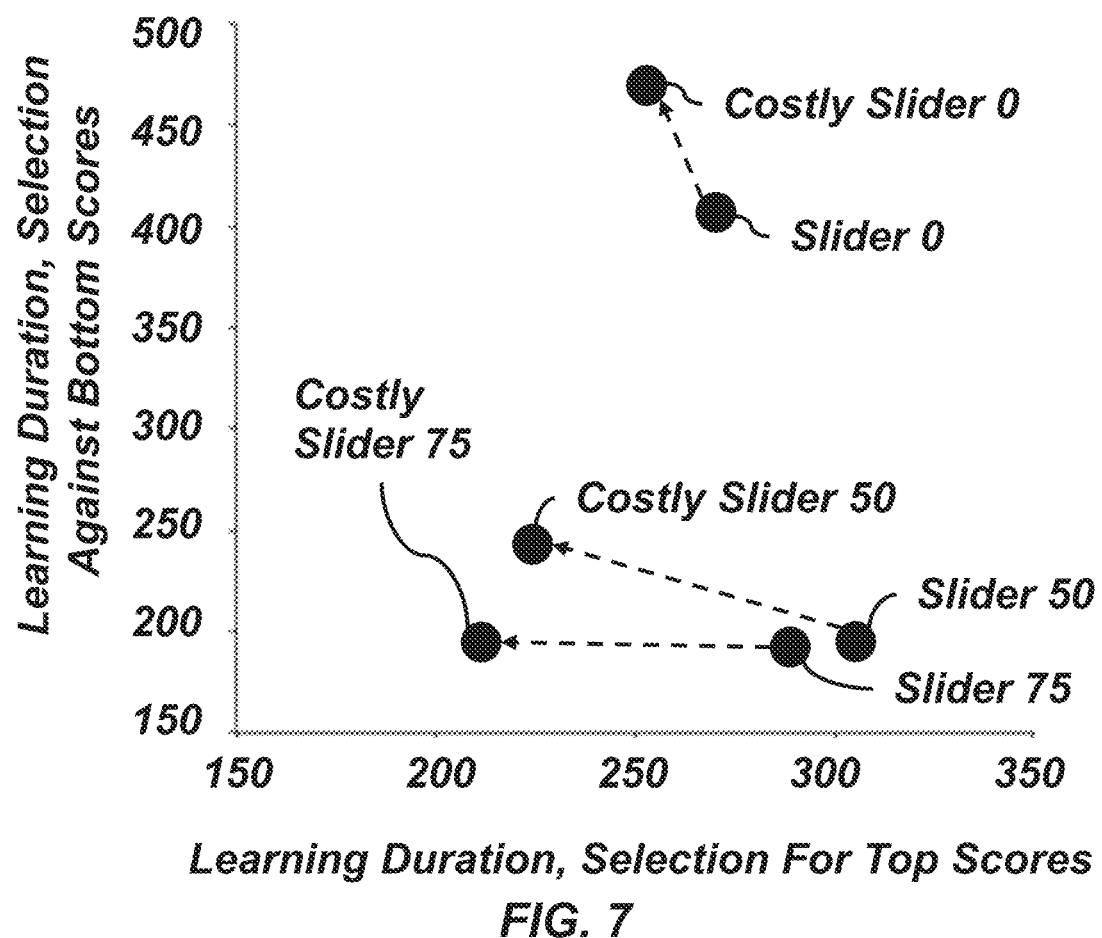
FIG. 7 is a graph showing a simulation of learning for various differential time cost scenarios.

Since scores that took longer to report (due to their distance from initial position) appear to be more informative than scores that took little or no time to report, it makes sense to test, more generally, if weighting each rating score by its time cost can improve correlations. One can pool all data for the slider groups (n=3,880 scores from 200 subjects), and calculate the $R^2$s between scores and ferry delays either as is, or after giving each rating score a weight based on its time cost (distance from initial slider position). It was found that the $R^2$s between ferry delays and rating scores is significantly higher when scores are cost weighted ($R^2 \sim 0.19$ vs $\sim 0.27$, P=0.009). Some, but not all of this effect is due to removal of default scores (where time cost is 0). For example, in the slider-75 group, removing default scores increase pooled $R^2$ from 0.30 to 0.37, but the cost-weighted correlation increased it further to 0.43. Given that imposing time costs on reporting extreme scores appears to increase reliability, it was examined whether imposing even greater time costs might further improve reliability. To do this, variable-friction sliders were used. For each slider the friction was set to be an increasing function of the deviation from its initial position. In this way, a steep time cost of up to 10 s was imposed for reporting extreme deviations from the default (see FIGS. 3A-3C, right graphs). Three groups were tested: slider-0 cost, slider-50 cost, and slider-75 cost with n=40 subjects per group, and compared results to those of the corresponding low-friction slider groups. In all three "slider-cost" groups, imposing higher friction eliminated high concentrations of scores at the top and shifted the distributions of rating scores toward a normal distribution, as indicated by the lower Kolmogorov-Smirnov statistics (0.16 vs 0.09 for slider-0, 0.12 vs 0.08 for slider-50, and 0.1 vs 0.09 for slider-75). However, despite the improvements in distribution shapes, imposing high time costs on reporting extreme scores did not affect $R^2$s. Still, the effect of costs at the margins of the distribution of scores changed the efficiency of different selection policies over time: in all groups, increasing time cost shortened simulated learning duration for selecting services based on top scores, compared with baseline (see FIG. 7). In contrast, selecting against bottom scores, learning duration was either longer (for slider 0 and slider 50) or unchanged (for slider 75). This asymmetry has a simple explanation: in the ferry simulation game, subjects were willing to pay high time costs for reporting top scores but not for reporting bottom scores.

Example 2

According to costly signaling theory, the failure to improve $R^2$s by imposing higher signaling time costs may be explained by a possible ceiling effect of signaling cost relative to the benefit: In the current game, signalers' expectation of benefits in return to signaling effort should be low. Therefore, perceived net benefits, and hence motivation, should diminish quickly with signaling costs, making extreme scores too costly. However, if the perceived benefit of signaling can be enhanced, imposing a steeper cost function should improve $R^2$s. To test this prediction, one can develop a fast-pace game, where ferries from three different companies bring, in turns, coins to the player. As in the previous game (Example 1), subjects received a one cent bonus for each coin, but here the rate of collecting coins is four times faster, gains are directly linked to ferry companies' performance, and subjects were instructed to score ferries accurately to maximize their gains. Subjects were not allowed to directly select companies, but companies that perform poorly were occasionally replaced by new ones. This replacement, in addition to changes in ferry performance during the game, were designed to create the false impression that accurate rating scores should increase monetary gains. In a survey after the game, most subjects (incorrectly) guessed that the rating scores they provided had affected, or might have affected ferry performance.

The game included 36 ferry trips. In trips 1-18 each ferry brought two coins in each trip, and trip durations (terry speed) varied between 4 and 10 s (0.2-0.5 coins per second). Then, during trips 19-36, we introduced a step increase in variation: the range of trip durations was increased to 1-14 s and variability in the number of coins each ferry brought in each trip was introduced in the range of 1-3 (0.1-1.5 coins per second). In a pilot study, it was found that the center of the distribution of scores in this game is fairly close to the center of the scale (mean score 54), and therefore the slider default position was set at 50. Three groups with 40 subjects per group were tested: click bar, slider 50 (low friction), and slider-50 cost (high friction), using the same cost functions as in FIG. 3B.

Figure 8:
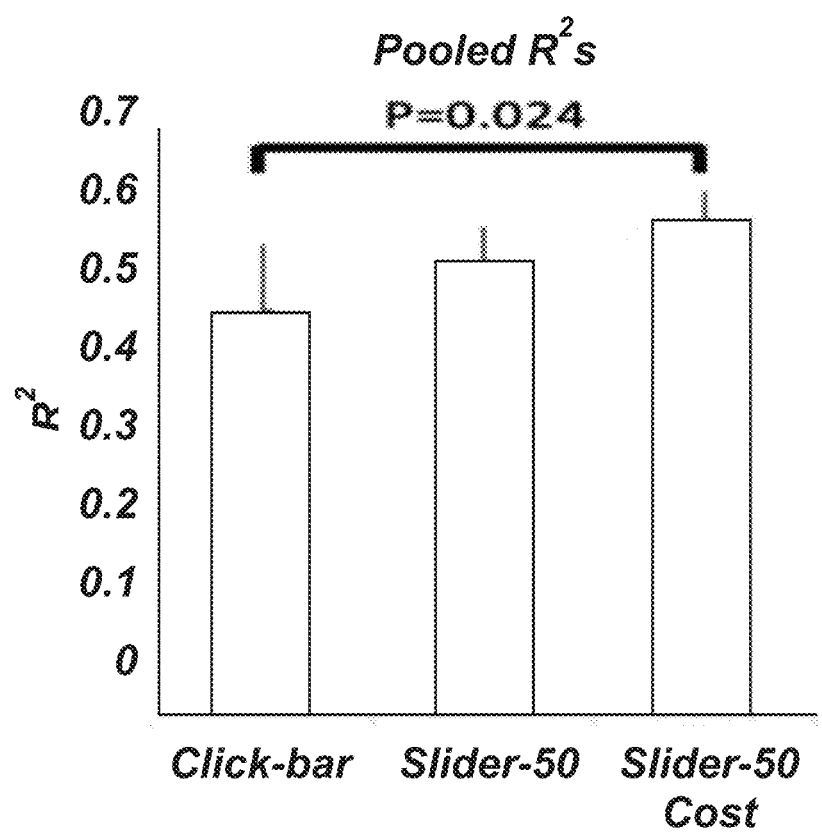
FIG. 8 is a graph of pooled $R^2$s with 95% confidence intervals for each group. Sliders cost functions are the same as in slider 50 and slider-50 cost in FIG. 3B. P values are Bonferroni adjusted.

As predicted by costly signaling theory, $R^2$s were highest in the slider-50-cost group (FIG. 8). Planned pairwise comparisons using shuffle statistics reveal a statistically significant difference in $R^2$s only between the click-bar group and the slider-50-cost groups (P=0.024, Bonferroni adjusted). The efficiency of different selection policies over time in each group was then evaluated. As expected, rating scores obtained from the slider-50-cost group gave the shortest learning durations. However, both slider groups were superior to the click bar in the selection regime that avoided bottom ratings. In contrast, only slider-50 cost was superior to click bar in the selection regime that favored top ratings. This outcome is similar to that of the previous example. Here too, subjects were willing to pay high time costs for reporting top scores, but less so for reporting bottom scores.

Finally, the rating behavior was examined separately during the low variation trials 1-18 and during the later high-variation trials. During the early, low-variation trials, scatterplot of ferry performances (coins per second) versus rating scores show tighter determination of ferry performance on rating scores in the slider-50-cost group compared with both the click bar and the slider 50, with $R^2$s almost two times higher in the cost group. In contrast, after the transition from low- to high-variation trials the distribution of rating scores remained broad only in the slider-50-cost group, but became bimodal in the click bar and slider 50, with clustering at the margins. Such polarized distribution of rating scores should decrease information, and indeed, here the benefits of the costly slider are better captured by mutual information compared with $R^2$s. In sum, in this dynamic setting the variable-friction slider reduced the scatter in the center of the distribution when variance in service performance was low and prevented clustering at the margins of the distribution after the transition to high variance.

Those skilled in the art will recognize, or be able to ascertain using no more than routine experimentation, many equivalents to the specific embodiments of the invention described herein. Such equivalents are intended to be encompassed by the following claims.

What is claimed:

1. A method for leveraging the wisdom of the crowd with online ratings, comprising:
    displaying at least one user selectable interface component related to a displayed rating value, the at least one user selectable interface component comprising either:
        two buttons on either side of a displayed rating; or
        two buttons on a same side of a displayed rating;
    allowing a user to click the at least one user selectable interface component in order to adjust the displayed rating value from an initial rating value to an adjusted rating value, where a differential time cost for adjusting the displayed rating value is introduced, the differential time cost based on a difference between the adjusted rating value and the initial rating value, such that a first difference has a first time cost, and a second difference greater than the first difference has a second time cost greater than the first time cost, where the user must maintain a depression of a button of an input device to adjust the displayed rating value, slowing a rate at which the displayed rating as the difference between the adjusted rating value and the initial rating value increases or decreases;
    determining a value by cost-weighting the adjusted rating value; and
    calibrating the displayed rating value at the crowd level based on the determined value and considering within-subject variation.

2. The method according to claim 1, wherein there is a linear relationship between the differential time cost and the difference between the adjusted rating value and the initial rating value.

3. The method according to claim 1, wherein there is a nonlinear relationship between the differential time cost and the difference between the adjusted rating value and the initial rating value.

4. The method according to claim 1, wherein an increase in the differential time cost only occurs if the adjusted rating value is higher than the initial rating value.

5. The method according to claim 1, further comprising:
    displaying a button for submitting the displayed rating value; and
    sending to a remote server the displayed rating value that was displayed when the button was clicked or selected by a user.

6. The method according to claim 1, further comprising sending at least one adjusted rating value to a remote server.

7. The method according to claim 1, wherein the at least one user selectable interface component is a slider bar.

8. The method according to claim 1, wherein the at least one user selectable interface component comprises a first button that adjusts the ratings up, and a second button that adjusts a rating value downward.

9. The method according to claim 1, wherein the initial rating value displayed for a first user is at least partially based on previous ratings provided by at least one other user.

10. The method according to claim 1, wherein the displayed rating value is associated with a product.

11. The method according to claim 10, wherein the differential time cost can vary by product.

12. A system for leveraging the wisdom of the crowd with online ratings, comprising:
    a processor configured to:
        display at least one user selectable interface component related to a displayed rating value, the at least one user selectable interface component comprising either:
            two buttons on either side of a displayed rating; or
            two buttons on a same side of a displayed rating;
        allow a user to click the at least one user selectable interface component in order to adjust the displayed rating value from an initial rating value to an adjusted rating value, where a differential time cost for adjusting the displayed rating value is introduced, the differential time cost based on a difference between the adjusted rating value and the initial rating value, such that a first difference has a first time cost, and a second difference greater than the first difference has a second time cost greater than the first time cost;
        determine a value by cost-weighting the adjusted rating value; and
        calibrate the displayed rating value at the crowd level based on the determined value and considering within-subject variation; and
    an input device comprising a button a user can depress to cause the displayed rating value to increase or decrease, wherein the user must maintain a depression of a button of an input device to adjust the displayed rating value, slowing a rate at which the displayed rating as the difference between the adjusted rating value and the initial rating value increases or decreases.

13. The system according to claim 12, wherein there is a linear relationship between the differential time cost and the difference between the adjusted rating value and the initial rating value.

14. The system according to claim 12, wherein there is a nonlinear relationship between the differential time cost and the difference between the adjusted rating value and the initial rating value.

15. The system according to claim 12, wherein an increase in the differential time cost only occurs if the adjusted rating value is higher than the initial rating value.

16. The system according to claim 12, wherein the processor is further configured to display a button for submitting the displayed rating value, and send to a remote server the displayed rating value that was displayed when the button was clicked or selected by a user.

17. The system according to claim 12, wherein the processor is further configured to send at least one adjusted rating value to a remote server.

18. The system according to claim 12, wherein the at least one user selectable interface component is a slider bar.

19. A system for leveraging the wisdom of the crowd with online ratings, comprising:

a remote server configured to send code to a client causing the client to display at least one user selectable interface component related to a displayed rating value, the at least one user selectable interface component comprising either:

two buttons on either side of a displayed rating; or two buttons on a same side of a displayed rating; and the client configured to allow a user to click the at least one user selectable interface component in order to adjust the displayed rating value from an initial rating value to an adjusted rating value, where a differential time cost for adjusting the displayed rating value is introduced, the differential time cost based on a difference between the adjusted rating value and the initial rating value, such that a first difference has a first time cost, and a second difference greater than the first difference has a second time cost greater than the first time cost, where the user must maintain a depression of a button of an input device operably coupled to the client to adjust the displayed rating value, slowing a rate at which the displayed rating as the difference between the adjusted rating value and the initial rating value increases or decreases; and wherein the system is further configured to determine a value by cost-weighting the adjusted rating value and calibrate the displayed rating value at the crowd level based on the determined value and considering within-subject variation.

20. The system according to claim 19, wherein the client sends a code to the remote server indicating an adjusted rating value, and in response the remote server sends a code to the client indicating a differential time cost associated with the adjusted rating value.

* * * * *